(12) United States Patent
Stickle

(10) Patent No.: US 10,331,695 B1
(45) Date of Patent: Jun. 25, 2019

(54) REPLICATION COORDINATION SERVICE FOR DATA TRANSFERS BETWEEN DISTRIBUTED DATABASES

(71) Applicant: Amazon Technologies, Inc., Reno, NV (US)

(72) Inventor: Thomas Charles Stickle, Saint James, NY (US)

(73) Assignee: Amazon Technologies, Inc., Reno, NV (US)

( * ) Notice: Subject to any disclaimer, the term of this patent is extended or adjusted under 35 U.S.C. 154(b) by 561 days.

(21) Appl. No.: 14/089,205

(22) Filed: Nov. 25, 2013

(51) Int. Cl.
*G06F 17/30* (2006.01)
*G06F 16/27* (2019.01)
*G06F 17/00* (2019.01)

(52) U.S. Cl.
CPC .................. *G06F 16/27* (2019.01)

(58) Field of Classification Search
USPC ............................................ 707/634
See application file for complete search history.

(56) References Cited

U.S. PATENT DOCUMENTS

| | | | | |
|---|---|---|---|---|
| 5,933,816 A * | 8/1999 | Zeanah | ............... | G06Q 20/00 705/35 |
| 6,012,095 A * | 1/2000 | Thompson | .......... | H04L 41/0213 709/231 |
| 6,199,068 B1 * | 3/2001 | Carpenter | ............... | G01D 4/004 |
| 6,535,868 B1 * | 3/2003 | Galeazzi | ........... | G06F 17/30371 |
| 6,615,223 B1 * | 9/2003 | Shih | ....................... | G06F 16/27 707/625 |
| 7,403,949 B2 * | 7/2008 | Cannon | ............. | G06F 17/30489 |
| 7,599,947 B1 * | 10/2009 | Tolbert | .............. | G06F 17/30569 |
| 7,788,300 B2 * | 8/2010 | Kuck | .................. | G06F 12/0253 707/813 |
| 7,809,764 B2 * | 10/2010 | Mak | .................. | G06F 17/30575 707/752 |
| 8,121,978 B2 * | 2/2012 | Wiss | .................. | G06F 11/2071 707/615 |
| 8,392,400 B1 * | 3/2013 | Ransil | ................. | G06F 11/1446 707/716 |

(Continued)

OTHER PUBLICATIONS

"Bigtable: A Distributed Storage System for Structured Data", Fay Chang, et al., 2006, pp. 1-14.

(Continued)

*Primary Examiner* — Polina G Peach
(74) *Attorney, Agent, or Firm* — Robert C. Kowert; Meyertons, Hood, Kivlin, Kowert & Goetzel, P.C.

(57) ABSTRACT

A replication coordination service may be implemented to coordinate data transfers between distributed databases according to a canonical data format. A coordination request may be received at a replication coordination service to transfer data between a primary distributed database and a recipient distributed database. Configuration information may be obtained for the primary and recipient distributed database to generate a data transfer scheme to be maintained at the replication coordination service. The primary distributed database may be provided with access to the data transfer scheme in order to perform the data transfer. In some embodiments, the replication coordination service may be implemented as part of the same provider network as the distributed databases.

20 Claims, 10 Drawing Sheets

(56) References Cited

U.S. PATENT DOCUMENTS

| | | | |
|---|---|---|---|
| 9,230,000 B1* | 1/2016 | Hsieh | H04L 67/1095 |
| 9,430,541 B1* | 8/2016 | Johnson | G06F 16/27 |
| 2001/0027453 A1* | 10/2001 | Suto | H04L 67/1095 |
| 2002/0023091 A1* | 2/2002 | Silberberg | G06F 16/27 |
| 2006/0101452 A1* | 5/2006 | Mak | G06F 16/27 |
| | | | 717/168 |
| 2006/0282482 A1* | 12/2006 | Castro | G06F 16/27 |
| 2007/0061543 A1* | 3/2007 | Uppala | G06F 17/30587 |
| | | | 711/173 |
| 2007/0168336 A1* | 7/2007 | Ransil | G06F 16/958 |
| 2008/0256143 A1* | 10/2008 | Reddy | G06F 17/30312 |
| 2010/0223240 A1* | 9/2010 | Cooper | G06F 16/2228 |
| | | | 707/696 |
| 2011/0110568 A1* | 5/2011 | Vesper | G06F 19/321 |
| | | | 382/128 |
| 2012/0209820 A1* | 8/2012 | Patterson | G06F 12/0261 |
| | | | 707/692 |
| 2013/0124475 A1* | 5/2013 | Hildenbrand | G06F 17/30351 |
| | | | 707/636 |
| 2013/0282668 A1* | 10/2013 | Hsieh | G06F 17/30303 |
| | | | 707/691 |
| 2014/0006216 A1* | 1/2014 | Malapati | G06Q 30/0635 |
| | | | 705/26.81 |
| 2014/0108558 A1* | 4/2014 | Borzycki | G06F 21/6218 |
| | | | 709/205 |
| 2014/0114913 A1* | 4/2014 | Engelko | G06F 17/30079 |
| | | | 707/609 |
| 2014/0143284 A1* | 5/2014 | McCaffrey | G06F 17/30297 |
| | | | 707/803 |

OTHER PUBLICATIONS

"CloudBatch: A Batch Job Queuing System on Clouds with Hadoop and HBase", Chen Zhang, et al., Nov. 2010, pp. 1-8.

* cited by examiner

REPLICATION COORDINATION SERVICE FOR DATA TRANSFERS BETWEEN DISTRIBUTED DATABASES

BACKGROUND

Distributed applications, by nature of being distributed, may divide up tasks, problems, or operations among different distributed components of a distributed system. Such distribution offers several advantages. Complex or computing resource intensive tasks may be divided up among multiple low-end computing systems, instead of relying upon a more expensive, monolithic system. The number of computing systems that make up a distributed system for a distributed application may be more easily scaled up or down to reflect changing needs for distributed applications. Distributed systems may also be beneficial when the nature of the tasks performed by an operation, such as where data is generated in one location, and process, stored, or analyzed in another, are physically distributed.

The advantages afforded by distributed applications have led to increasingly large sets of data. These large data sets may be more easily maintained, analyzed, accessed, or update in distributed systems. Moreover, the benefits of collecting and maintaining large amounts of data may lead to data sharing between different entities that may ascertain valuable information based on the data. However, transferring large amounts of data between entities, such as between distributed storage systems that maintain the data may prove complicated. Distributed systems, as noted above, employ multiple computing systems among which data may be distributed. Thus, ensuring that the proper data is transferred from one distributed system to another may prove burdensome in its complexity.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Systems and methods described herein may be employed in various combinations and in various embodiments to implement a replication coordination service for data transfers between distributed databases or other structured data stores. Distributed databases or systems, may be configured to maintain data (such as large amounts of data or "big data") among multiple components in the distributed database (referred to herein as "compute or storage nodes"). Typically, transferring large amounts of data between distributed databases may occur via an intermediary storage format and/or system. However, for distributed databases that maintain data according to a same canonical data format (sometimes referred to as a canonical data model), such as by implementing a same storage scheme, direct data transfers may occur.

Figure 1:
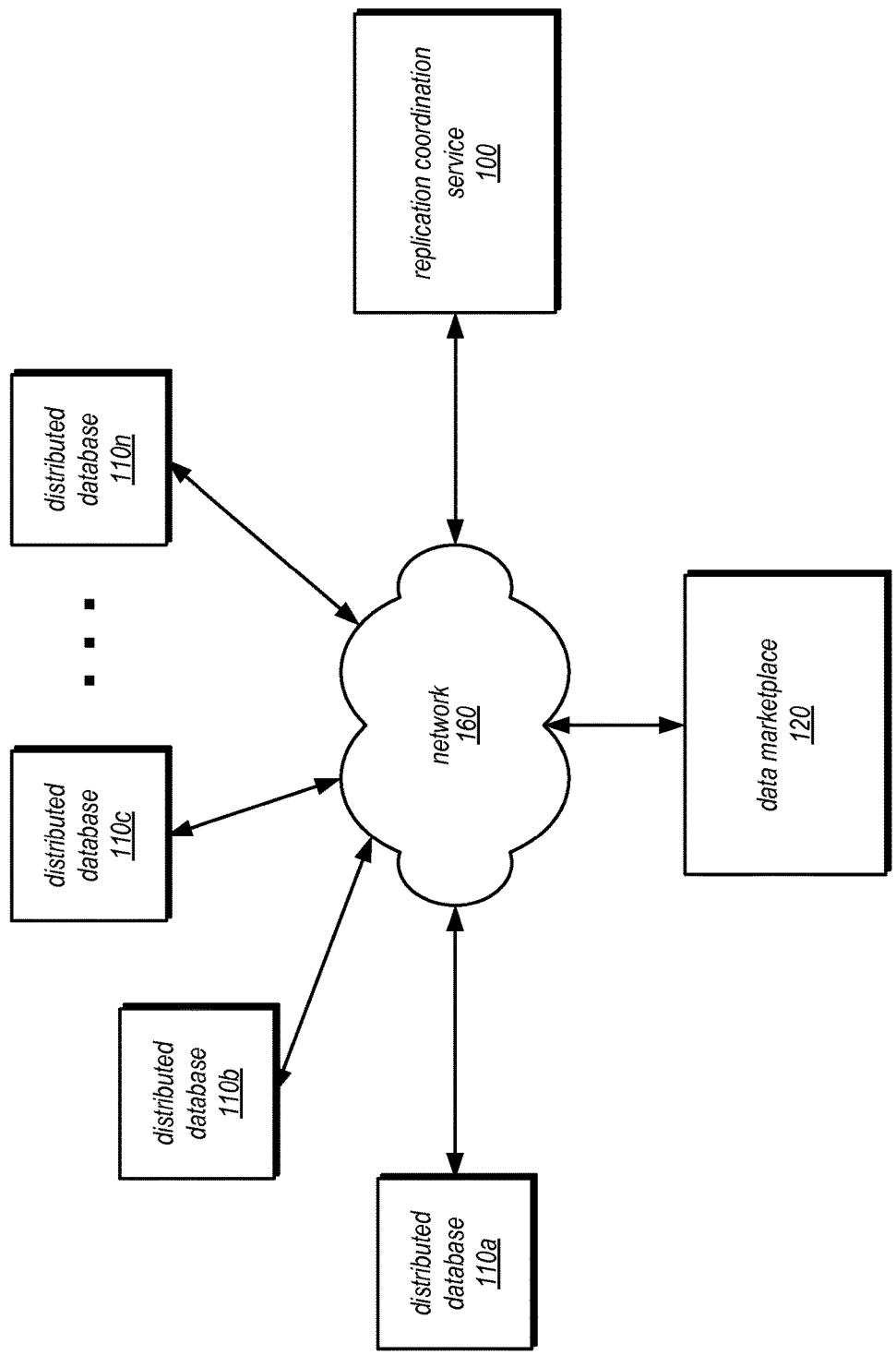
FIG. 1 is a block diagram illustrating an operating environment for a replication coordination service, according to some embodiments.

Distributed applications, such as distributed databases, may divide the work of maintaining data and transferring data among the multiple compute nodes that may make up a distributed database. For direct data transfers between distributed databases, coordination between different compute nodes in the distributed databases may allow to efficiently perform data transfers. For example, a replication coordination service for data transfers may manage registration of distributed databases between which a data transfer is to be made, maintain the current state of data transfers, and/or handle failure among compute nodes in the distributed databases. The replication coordination service may facilitate transfer of data directly between distributed databases of different entities according to a canonical data format. For example, the primary distributed database may not have to first write data to an intermediary data store, but may directly send the data to storage locations in the recipient distributed databases. FIG. 1 is a block diagram illustrating an operating environment for a replication coordination service, according to some embodiments.

FIG. 1 illustrates a replication coordination service, replication coordination service 100, which may provide the various replication coordination services for data transfers mentioned above, as well as various other services, that may allow distributed databases to perform coordinated data transfers. In various embodiments, replication coordination service 100 may be a highly-available service. For example, in various embodiments replication coordination service 100 may be implemented by multiple compute nodes or clusters of compute nodes that maintain coordination data, such as current state information for a data transfer (e.g., tracking or progress information for the data transfer such that the data transfer may be resumed at a failure or other error point) or a data transfer scheme, among the compute nodes according to a distributed durability scheme. A distributed durability scheme may provide various techniques for ensuring redundancy, consistency, reliability and/or availability among the compute nodes implementing replication coordination service. For example, in some embodiments, replication coordination service may implement a Paxos-based or other consensus technique.

Clients of the replication coordination service may be one or more distributed databases, such as distributed databases 110a, 110b, 110c, through 110n. For example, an entity, such as a corporation, organization, or service, may collect, maintain, and/or analyze data that is desirable to another entity (e.g., a financial services company may collect financial market performance data for a specific sector of industry that a business within that industry may wish to analyze) at distributed database 110a. The entity control distributed database 110a may in turn sell to or trade this data with one or more recipient distributed databases, such as distributed database 110b. Distributed databases 110a and 110b may transfer the data according to a same canonical data format. A canonical data format may be the data format in which data is maintained for the transfer between distributed databases. Column-oriented storage, document storage, object storage, key value storage, or sorted map may be some examples of canonical data formats. In at least some embodiments, distributed databases may be NoSQL databases.

In order to perform data transfer between distributed database 110a and distributed database 110b, distributed database 110a may send a coordination request via network 160 (which may be any private or public communication network, such as the Internet) for data transfer to replication coordination service 100. A coordination request may include configuration information, as well as other information about distributed database 110a (such as identity, locations, addresses, which portions of data are maintained, etc.). Replication coordination service 100 may receive the coordination request and establish a transfer relationship between distributed database 110a and distributed database 110b. For example, replication coordination service 100 may register the identified parties of a data transfer in a list, queue, or other data structure, that maintains data transfers to be coordinated by replication coordination service 100. Distributed database 110a which may be transferring the data may be identified as the primary distributed database, while distributed database 110b may be identified as the recipient distributed database. In some embodiments, replication coordination service 100 may request from recipient distributed database 110b configuration information in order to complete registration of the data transfer operation. In some embodiments, recipient distributed database 110b may send a registration request for data transfer to replication coordination service, which may then be associated with the corresponding coordination request for data transfer sent from the primary distributed database 110a (such as by including a transfer operation id, or other indicator of the data transfer to which the recipient distributed database 110b is a party to). In some embodiments, recipient distributed database 110b may send the initial coordination request to replication coordination service 100, which may in turn obtain configuration information from primary distributed database 110a.

In various embodiments, replication coordination service 100 may then generate a data transfer scheme for the coordinated data transfer. For example, in some embodiments, the data transfer scheme may include identities, locations, and assignments of transfer operations to be performed by storage nodes of distributed database 110a with respect to storage nodes of distributed database 110b (e.g. which data maintained at a particular storage node is to be copied to another storage node). A data transfer scheme, in some embodiments, may indicate whether a data transfer between primary distributed database 110a and recipient distributed database 110b is to be a single data transfer, or multiple (e.g., recurring) data transfers performed at specified intervals (such as once a week, month, quarter, etc.). Current state information may be maintained at replication coordination service 100 for the data transfer as well, such as whether the data transfer operation is currently being performed/enabled, or whether a given storage node in the primary distributed database 110a or the recipient distributed database 110b is unavailable.

In some embodiments, distributed databases 110 (or other clients or systems communicating with replication coordination service 100) may utilize an interface for replication coordination service 100, such as an administrative console and/or programmatic interface such as an Application Programming Interface (API). For example, various requests, messages, notifications or updates may be supported by replication coordination service 100 through an API. In some embodiments, for instance, primary distributed database 110a may send a request to replication coordination service 100 to create and/or initiate (or start) a data transfer, terminate or pause an existing transfer, determine start and/or start times for future data transfers, etc.

In some embodiments, replication coordination service 100 may provide primary distributed database 110a access to a data transfer scheme generated for the distributed database in order to perform the coordinated data transfer. Providing access may include providing pointers, endpoints, credentials, addresses, locations, and/or other information that may allow storage nodes or other components of distributed database 110a to access the data transfer scheme. In some embodiments, replication coordination service 100 may also provide authentication and/or other access credentials to primary distributed database 110a in order to communicate with and/or transfer data to recipient distributed database 110b. Similarly, replication coordination service 100 may reconfigure network traffic controls, such as firewalls, to allow communication between primary distributed database 110a and recipient distributed database 110b. Access to the data transfer scheme may be provided to primary distributed database 110a, in some embodiments, without a request to initiate data transfer but instead when the data transfer scheme has been generated.

Upon receiving access to the data transfer scheme, primary distributed database 110a may begin performing the coordinated data transfer. As noted above, different storage nodes of primary distributed database 110a may store different portions of the data to be transferred. For example, different groups of storage nodes within the primary distributed database may be responsible for different portions of data that is to be transferred. These different groups (or a leader, master, or other node within these different groups) may each perform transfer operations to send the data to storage nodes in recipient distributed database 110*b* according to the data transfer scheme.

In some embodiments, primary distributed database 110*a* may generate transfer logs in the course of performing the coordinated data transfer which indicate which portions of data have already been sent to recipient distributed database 110*b*, or portions of remaining data to be sent. In some embodiments, these transfer logs may be sent as updates to current state information maintained at replication coordination service 100, or may be stored or maintained at replication coordination service 100 separately. In some embodiments, these transfer logs may be associated with a particular storage node performing the data transfer indicated in the log. Other updates or new state information may be sent to replication coordination service 100 for the coordinated data transfer. For example, in some embodiments, based on notifications or updates from primary distributed database 110*a*, replication coordination service 100 may detect that one of the storage nodes in primary distributed database 110*a* is unavailable (e.g., failed, frozen, etc.) and may provide access to the transfer logs associated with the unavailable storage node to another available storage node in distributed database 110*a* so that the remaining storage node may reallocate or reassign the transfer logs (or remaining transfer operations indicated in the transfer logs) to itself for performance.

Other coordination requests/updates sent to replication coordination service 100 may include termination requests, new storage nodes added to primary distributed database 110*a*, requests for additional information, new or additional authentication or security credentials, as well as changes to the state of primary distributed database 110*a*, such as storage node failures, role changes (e.g., leader node elections), or any other changes to the configuration of primary distributed database 110*a*. Similarly, in some embodiments, recipient distributed database 110*b* may be configured to send transfer state updates, which may be any changes to the configuration of recipient distributed database 110*b*. For example, in some embodiments, transfer state updates may include indications that a storage node in distributed database 110*b* is no longer available. Replication coordination service 100 may provide transfer state updates to primary distributed database 110*a* (which may reflect changes such as the unavailability of storage nodes in recipient distributed database 110*b*), as well as other state changes (which may occur as a result of actions by different nodes of storage nodes which may not be known to other storage nodes).

In various embodiments, replication coordination service 100 may be configured to charge a service fee, which may be associated with a customer account for replication coordination service 100. For example, an entity operating primary distributed database 110*a* may have a customer account with replication coordination service 100 which may be debited services for each coordinated data transfer performed using replication coordination service 100. In various embodiments, billing metrics (e.g., the amount of data divided by the amount of time spent transporting the data) may be calculated during or after the data transfer. In some embodiments, billing metrics may include the amount of time spent performing the data transfer and/or the amount resources used to implement the coordination (e.g., a number of compute nodes) may also be determined. A service fee may be determined, in various embodiments, based, at least in part on one or more of these billing metrics (e.g., throughput, time spent, resources used), as well as different other factors.

Replication coordination service 100 may be highly available and configured to perform coordination for multiple data transfers between distributed databases 110. Some data transfers may include multiple recipients. For example distributed database 110*c* may use replication coordination service to transfer data to both distributed database 110*b* and distributed database 110*a*.

In some embodiments, a data marketplace 120 may provide network-based marketplace for different entities controlling distributed databases 110 to sell, trade, or transfer data to other entities. Users/clients/customers who wish to sell individual data objects or files, and/or subscriptions to data, may offer the data for sale as part of data marketplace 120. Replication coordination service 100 may be invoked to facilitate the transfer of data between distributed databases 110 as part of (or in response to) transactions that have been performed in data marketplace 120. For example, a web-analytics firm may collect and store large amounts of user interactions for various websites. The web-analytics firm may perform analysis and conversion of the data into trends, sectors, markets, etc. and offer a subscription to obtain new data for one or more of these data on quarterly basis. Replication coordination service 100 may be utilized to coordinate data transfers between the data on distributed databases utilized by the web-analytics firm to distributed databases utilized by subscribers to the data purchase via data marketplace 120.

This specification begins with a general description of distributed databases and a replication coordination service, which may provide coordinated data transfers between distributed databases. Then various examples of a replication coordination service for data transfers between distributed databases are discussed, including different components/modules, or arrangements of components/module that may be employed as part of implementing a replication coordination service. A number of different methods and techniques to implement a replication coordination service for data transfers between distributed databases are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
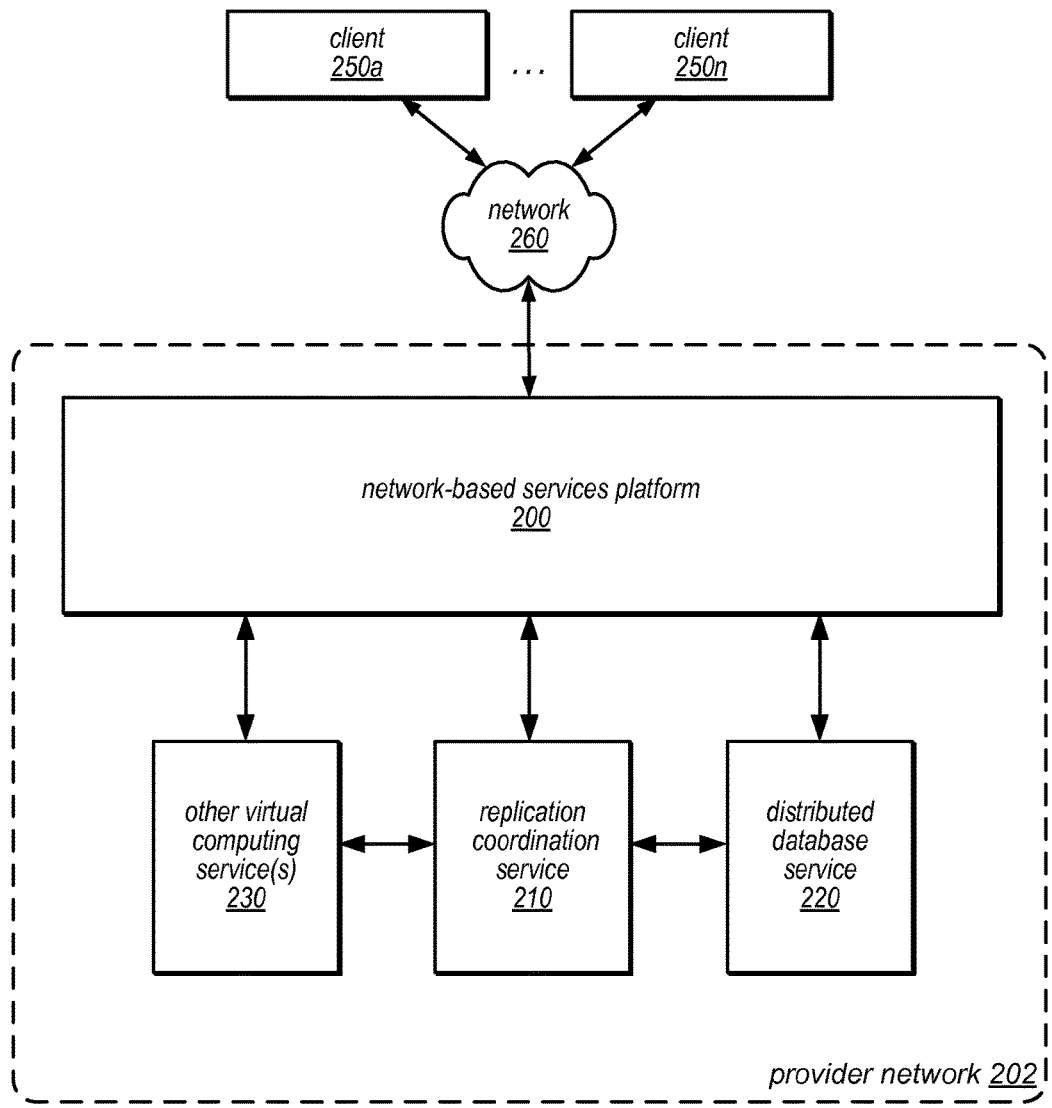
FIG. 2 is a block diagram illustration of a provider network implement a network-based services platform, according to some embodiments.

FIG. 2 is a block diagram illustration of a provider network implementation of a network-based services platform, according to some embodiments. A replication coordination service 210, as discussed above in FIG. 1, may be implemented as part of a provider network 202, which may include network-based services platform 200, and may be configured to communicate with distributed database service 220, which in some embodiments may also be part of network-based services platform 200. Replication coordination service 210 and distributed database service 220 may also be configured to interact with other systems, components or entities, such as other virtual computing services 230 and/or clients 250.

In various embodiments, a number of clients (shown as clients 250*a*-250*n*) may be configured to interact with a network-based services platform 200 in a provider network via a network 260. Network 260 may be the Internet, a wide area network, a local area network, or any other network or combinations thereof. A provider network, such as provider network 202, may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. Network-based services platform 200 may be configured to interface with one or more instances of a replication coordination service 210, distributed database service 220, and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one key value data store component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a computational client) may encompass an application such as a database application (or user interface thereof), a media application, an office application or any other application that may make use of persistent storage resources to store and/or access one or more distributed databases or other computing services. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture. In some embodiments, clients 250 may be other distributed systems, such as distributed databases that may access replication coordination service 210 directly, or through network-based services platform 200.

In some embodiments, a client 250 may be configured to provide access to network-based services, such as replication coordination service 210, distributed database service 220, and/or other virtual computing services 230 in a manner that is transparent to those applications. For example, client 250 may be configured to interact with a distributed database implemented as part of distributed database service 220. This distributed database may implement utilize replication coordination service 210 in order to perform data transfers to another distributed database, such as may also be implemented as part of distributed database service 220. In such an embodiment, applications may not need to be modified to make use of the service model of FIG. 2. Instead, the details of interfacing to network-based services platform 200 may be coordinated by client 250 and the operating system or file system on behalf of applications executing within the operating system environment at a client 250.

Clients 250 may convey network-based services requests (e.g., data access request) to and receive responses from network-based services platform 200 via network 260. In various embodiments, network 260 may encompass any suitable combination of networking hardware and protocols necessary to establish network-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a data service system (e.g., a system that implements replication coordination service 210 and/or data storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements replication coordination service 210, distributed database service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data (such as database tables or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of operational metrics for services 210, 220 and/or 230, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of replication coordination service 210, distributed database service 220 and/or another virtual computing service 230 (or the underlying systems that implement those services).

In some embodiments, network-based services platform 200 may also implement user authentication and access control procedures. For example, for a given network-based services request to access a particular portion of data, such as a particular compute cluster, platform 200 may be configured to ascertain whether the client 250 associated with the request is authorized to access the particular compute cluster. In some embodiments, one of other virtual computing services 230 may be an authentication and/or access management service that may determine the identity of client 250. Platform 200 may determine such authorization by, for example, evaluating an identity, password or other credential against credentials associated with the particular database, or evaluating the requested access to the particular database against an access control list for the particular data. For example, if a client 250 does not have sufficient credentials to access the particular compute cluster, platform 200 may reject the corresponding network-based services request, for example by returning a response to the requesting client 250 indicating an error condition. Various access control policies may be stored as records or lists of access control information by replication coordination service 210, distributed database service 220 and/or other virtual computing services 230.

It is noted that while network-based services platform 200 may represent the primary interface through which clients 250 may access the features of replication coordination service 210 or distributed database service 220, it need not represent the sole interface to such features. For example, an alternate API that may be distinct from a network-based services interface may be used to allow clients internal to the enterprise providing the computing service to bypass network-based services platform 200. Note that in many of the examples described herein, replication coordination service 210 may be internal to a computing system or an enterprise system that provides computing services to clients 250, and may not be exposed to external clients (e.g., users or client applications). In such embodiments, the internal "client" (e.g., distributed database service 220) may access replication coordination service 210 over a local or private network, shown as the solid line between distributed database service 220 and replication coordination service 210 (e.g., through an API directly between the systems that implement these services). In such embodiments, the use of replication coordination service 210 in coordinating data transfers between distributed databases of distributed database service 220 on behalf of clients 250 may be transparent to those clients. In other embodiments, replication coordination service 210 may be exposed to clients 250 through network-based services platform 200 (or directly exposed) such that replication coordination services between clients 250 that are external distributed databases performing coordinated data transfers may be employed. In some embodiments, other virtual computing services 230 (e.g., an authentication service) may be configured to receive requests from replication coordination service 210, or distributed database service 220, (e.g., through an API directly between the virtual computing service 230 and computing service 220) to perform various other computing services 230 on behalf of a client 250. In some cases, the accounting and/or credentialing services of platform 200 may be unnecessary for internal clients such as administrative clients or between service components within the same enterprise.

Figure 3:
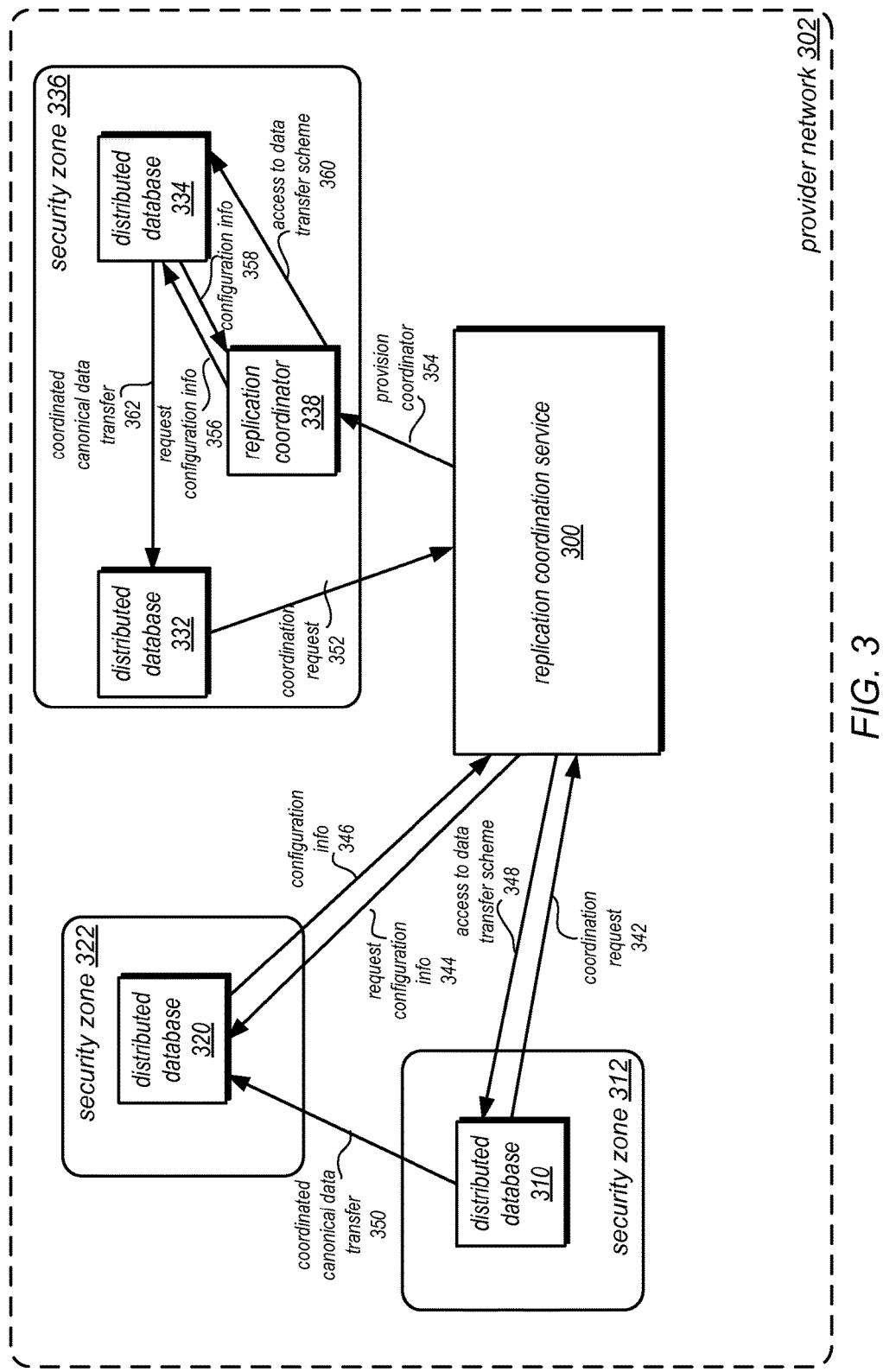
FIG. 3 is a block diagram illustrating a replication coordination service implemented as part of a provider network, according to some embodiments.

Coordinated data transfers may, in some embodiments, occur between distributed databases that are implemented as part of a same provider network, such as provider network 202. Such a provider network may implement a network-based services platform, as illustrated in FIG. 2, or separately provide a computational or other service that implements distributed databases. FIG. 3 is a block diagram illustrating a replication coordination service implemented as part of a provider network, according to some embodiments. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as computing system 1000 in FIG. 10 described below. In various embodiments, the functionality of a given storage service system component may be implemented by a particular computing node or may be distributed across several computing nodes. In some embodiments, a given computing node may implement the functionality of more than one distributed database or replication coordination service component.

Provider network 302 may provide computing resources that allow clients/customers/users of provider network 302 to set up, maintain, operate, and/or otherwise controls computing resources, such as distributed database systems. Distributed databases may be implemented by multiple storage (or compute) nodes that provide distributed storage for data maintained at a distributed database. In various embodiments, distributed databases may be scalable (increasing or decreasing) dependent on the amount of data to be maintained in a particular distributed database. In at least some embodiments, distributed databases may transfer data according to a canonical data format. A canonical data format may be the format according to which data is arranged. For example, in some embodiments a sorted map format (e.g. such as "Apache HBase") may be implemented at a distributed database, storing data in tables consisting of rows identifiable by a primary key stored in sorted order, where each row may have any number of columns (e.g., row key "A" has 2 columns, whereas row key "B" has 1 column). Another example canonical data format is a key-value store where each table maintained on behalf of a client/user contains one or more items, and each item includes a collection of attributes, and where the attributes of an item may be a collection of name-value pairs, in any order. Many other canonical data formats may be implemented at distributed databases, including, but not limited to various versions or implementations of column-oriented storage, document storage, object storage, and/or graph storage, and thus the previous examples are not intended to be limiting. In some embodiments, a canonical data format may be used to implement a NoSQL data store.

Data may also be distributed among storage nodes in respective distributed databases using various arrangements. For example, sharding may be used to partition portions of data among storage nodes, such as by partitioning data based on ranges of rows. Various durability schemes, such providing redundancy by mirroring, replicating, or otherwise ensuring durability of data maintained at a distributed database may be employed. For example, in some embodiments a durability requirement, such as the number of replicas of data, may be satisfied by storing the required number of replicas among different ones of the storage nodes.

FIG. 3 illustrates multiple distributed databases, 310, 320, 332, and 334. These distributed databases may be configured to communicate with replication coordination service 300. Replication coordination service 300, as discussed in more detail below with regard to FIGS. 4 and 5, may implement an interface, which in some embodiments may be programmatic, allowing distributed databases to interact with replication coordination service 300 in order to perform coordinated data transfers. Various requests, some of which are illustrated in FIG. 3, may be generated/formatted according to an API, and sent from distributed databases in order to carry out data transfers.

In some embodiments, provider network 302 may be configured to provide security zones, such as security zones 312, 322, and 336, in which computing systems, such as distribute databases may be implemented. These security zones may allow distributed databases to operate as if implemented on separate networks. For example, security zones may implement firewalls, security protocols, or other techniques to limit or prevent network traffic to computing resources implemented in a security zone.

In one example of a coordinated data transfer, distributed database 310 may send a coordination request 342 to replication coordination service 300. Replication coordination service 300 may establish or register the data transfer, such as by storing configuration information for distributed database 310 along with information identifying the recipient distribute database 320. In some embodiments, replication coordination service 300 may request configuration information 344 from the recipient distributed database 320 and upon receipt of configuration information 346, generate a data transfer scheme (as described below in further detail with regard to FIG. 4) in order for distribute database 310 to perform the data transfer. In various embodiments, replication coordination service 300 may be configured to obtain, generate, or assign authentication or security credentials so that distributed database 310 and 320 may securely transfer data. In some embodiments, replication coordination service 300 may be configured to reconfigure security zone 312 and/or security zone 322 to allow data transfer traffic between the distribute databases. Replication coordination service 300 may provide access to the data transfer scheme 348 to distributed database 310. Distributed database 310 may then use the data transfer scheme to perform coordinated canonical data transfer 350 with distribute database 320. Similar messages, requests, and techniques may be implemented for multiple recipient distributed databases, either simultaneously, or in succession.

In another example, distributed database 332 (implemented in the same security zone, 336, with distributed database 334) may send a coordination request 352 for data to be transferred from distributed database 334 to distributed database 332. In response, replication coordination service 300 may provision 354 a replication coordinator 338, such as by provisioning compute node resources to be assigned to security zone 336, and together implement coordination services for distributed databases 332 and 334. Replication coordinator 338 may send a request for configuration information 356 to distributed database to obtain back configuration information 358 for distributed database 334 (configuration information for distributed database 332 may have been included in coordination request 352 and passed on to replication coordinator 338). Replication coordinator 338 may then generate a data transfer scheme (as discussed above), and provide access 360 to the data transfer scheme to distributed database 334. Distributed database 334 may then perform coordinated canonical data transfer 362 to send data to distributed database 332.

FIG. 3 is provided merely for illustrative purposes only, and is not intended to be limiting, for example as to the number and/or configuration of distributed databases, the replication coordination service, or provider network.

Figure 4:
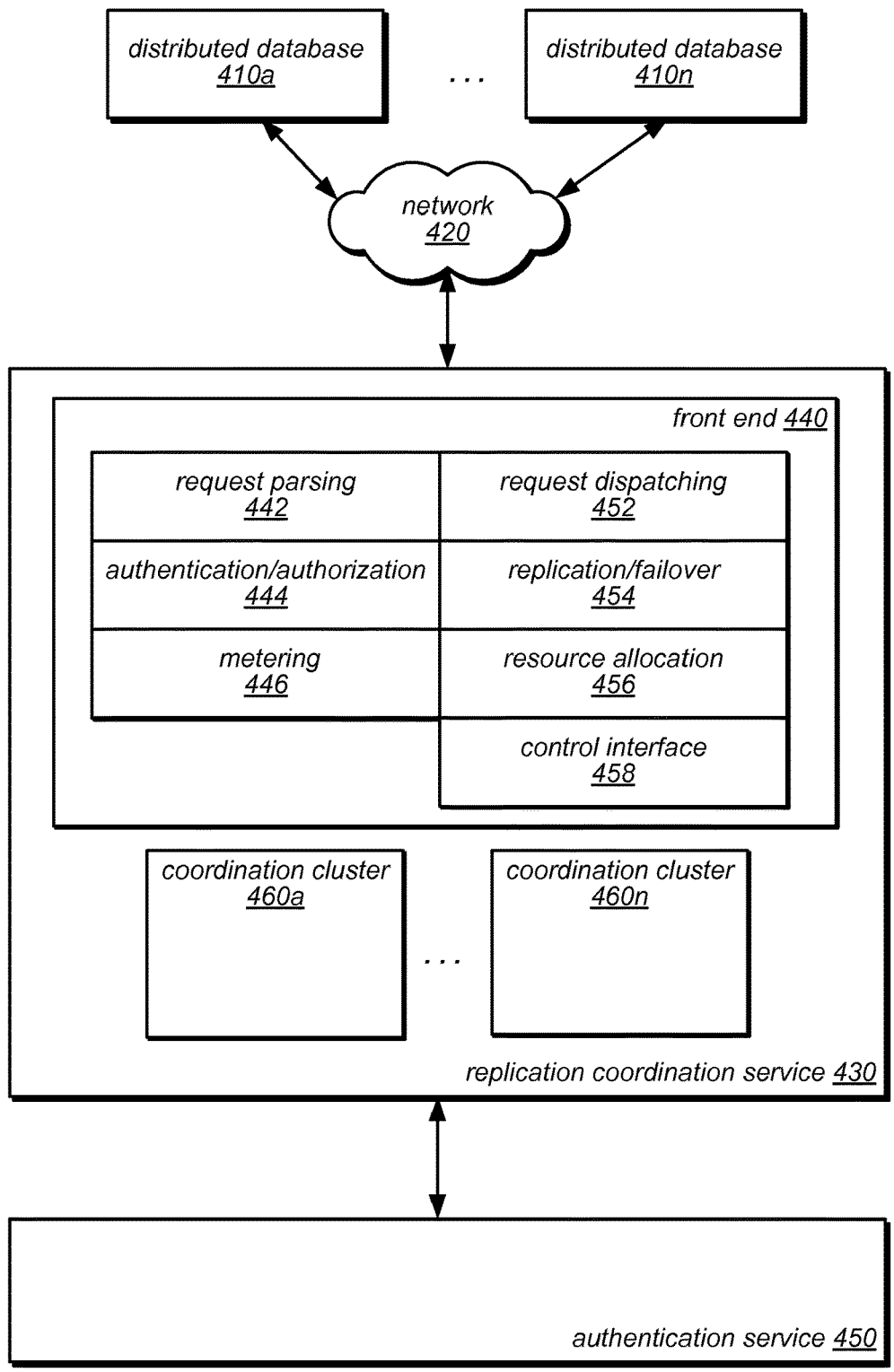
FIG. 4 is a block diagram illustrating a replication coordination service for data transfers between distributed databases, according to some embodiments.

A replication coordination service, in various embodiments, may be implemented that provides coordination for distributed system replication operations. A replication coordination service may be implemented as part of a network-based services platform in a provider network, as illustrated in FIG. 2, or separately. FIG. 4 is a block diagram illustrating a replication coordination service, according to some embodiments, which may be implemented either as part of a network-based services platform or as a standalone service. It is noted that where one or more instances of a given component may exist, reference to that component herein below may be made in either the singular or the plural. However, usage of either form is not intended to preclude the other. In various embodiments, the components illustrated in FIG. 4 may be implemented directly within computer hardware, as instructions directly or indirectly executable by computer hardware (e.g., a microprocessor or computer system), or using a combination of these techniques. For example, the components of FIG. 4 may be implemented by a distributed system including a number of computing nodes (or simply, nodes), such as computing system 1000 in FIG. 10 described below. In various embodiments, the functionality of a given computing system component may be implemented by a particular computing node or may be distributed across several computing nodes. In some embodiments, a given computing node may implement the functionality of more than one storage service system component.

Distributed databases 410a through 410n may encompass any type of distributed database, such as described above with regard to distributed databases 310, 320, 332, and 334 in FIG. 3. Distributed databases 410 may be configured to submit requests to replication coordination service 430 via network 420, similar to clients 250 described above. For example, a distributed database 410 may implement a module or component that may include sufficient protocol support (e.g., for a suitable version of Hypertext Transfer Protocol (HTTP)) for generating and processing service requests. That is, distributed databases 410 may be configured to interact directly with replication coordination service 430. In various embodiments, service requests to perform various operations may be generated according to an API implemented by replication coordination service 430.

Distributed databases 410 may convey services requests to and receive responses from replication coordination service 430 via network 420. In various embodiments, network 420 may encompass any suitable combination of networking hardware and protocols necessary to establish communications between distributed databases 410 and replication coordination service 430. For example, network 420 may generally encompass the various telecommunications networks and service providers that collectively implement the Internet. Network 420 may also include private networks such as local area networks (LANs) or wide area networks (WANs) as well as public or private wireless networks. For example, both a distributed database 410 and replication coordination service 430 may be respectively provisioned within enterprises having their own internal networks. In such an embodiment, network 420 may include the hardware (e.g., modems, routers, switches, load balancers, proxy servers, etc.) and software (e.g., protocol stacks, accounting software, firewall/security software, etc.) necessary to establish a networking link between given distributed databases 410 and the Internet as well as between the Internet and replication coordination service 430. It is noted that in some embodiments, distributed databases 410 may communicate with replication coordination service 430 using a private network rather than the public Internet. For example, distributed databases 410 may be provisioned within the same enterprise. In such a case, distributed databases 410 may communicate with replication coordination service 430 entirely through a private network 420 (e.g., a LAN or WAN that may use Internet-based communication protocols but which is not publicly accessible).

Replication coordination service 430 may include a front end module 440 to provide handle various distributed database requests, such as parsing 442 and/or dispatching of service requests 452, authentication (e.g., primary and recipient databases) and/or authorization (e.g., enforcing one or more authorization policies to determine whether a database is authorized to transfer and/or receive data) 444 and/or metering of service 446, as well as various administrative functions, such as to provide visibility and control to clients via an admin console implemented as part of a control interface 458, or to perform load/heat balancing, and/or anomaly control, and/or resource allocation 456 among replication coordination service resources, and support replication and failover 454 operations in order to maintain durability, consistency, and availability for replication coordination service 430. Replication coordination service 430 may also implement multiple coordination clusters 460a through 460n in which may include one or more compute nodes in order to ensure available and consistent access to a data transfer scheme for a particular data transfer that is maintained at a respective coordination cluster. Front end module 440 may also implement various logging capabilities, such as a may be used to perform various kinds of auditing for the replication coordination service 430.

In various embodiments, front end 440 may implement a control interface module 458. Control interface module may support an implementation of an API for the replication coordination service 430 that includes support for some or all of the following example operations: create (or establish) a data transfer, initiate (or start) a data transfer, terminate (or stop) a data transfer, get (or retrieve) access/credentials for a data transfer scheme (and/or security or authentication credentials to communicate with another distributed database), register (or identify) a recipient data store cluster, update (or modify) a data transfer scheme/current state information for a data transfer, and/or read (or access) portions or all of a data transfer scheme. Various other modifiers, flags, or options may be included in the API for these operations. For example, in some embodiments, a frequency or number of further data transfers may be performed when creating or establishing a data transfer, such that the data transfer may be performed at additionally a specified intervals or times. In another example, a specific time or condition may be set for performing a requested termination.

In some embodiments, control interface 458 may implement an administrative console, or some other graphical or user interface, which may be used by other systems controlled by entities who also control distributed databases performing data transfers to perform some or all of the operations described above. For example, a web-based interface may implement various user interface elements that may allow for the selection of and/or communication of various requests to replication coordination service 430. A transfer registration window, box, panel, or page may include various text-editable fields for entering information about a specific data transfer to create or establish. Similarly, a console may provide controls for starting, pausing, or stopping a data transfer that is coordinated by replication coordination service 430. Although not illustrated, such selections, indications, or other means of detecting input to the administrative console may be received over network 420 from clients (also as discussed above with regard to FIG. 2).

Front end 440 may also include request parsing 442 and request dispatching 452 components, in some embodiments. Create data transfer requests, for example, may invoke resource allocation module 456 which may provision compute nodes to implement a coordination cluster 460a, for example, to service the requested data transfer. Resource allocation module 456 may maintain or enforce various performance/resource requirements or limitations for replication coordination service 430, such as ensuring that a minimum number of compute nodes are available to allocate for a specific coordination cluster sufficient to service access request from a distributed database. If, for example, network traffic directed toward a particular coordination cluster exceeds some threshold for a current coordination cluster configuration (e.g., 3 compute nodes), then resource allocation module 456 may provision additional compute nodes (e.g., 2 additional compute nodes) to balance the traffic more efficiently among compute nodes of a coordination cluster. Front end 440 may implement replication/failover module 454 to manage or ensure that performance guarantees for availability and/or consistency for replication coordination service 430 are met. For example, replication/failover module 454 may instigate adding a new compute node to a coordination cluster 460 in response to a compute node failure, or electing a new leader node or adding a new role to a compute node in a coordination cluster 460. In some embodiments, coordination clusters 460 themselves may be responsible for handling node failovers, requesting additional compute nodes, or various other administrative functions described above.

Front end 440 may implement an authentication module 444 in some embodiments. Authentication module 444 may be configured to determine the identity of a distributed database 410, and a client/user/customer account associated with the distributed database 410. In various embodiments, authentication module 444 may be configured to request and obtain identification information from authentication service 450. Authentication service 450 may be configured to create and manage access to clients/users/customers data, such as may be stored in a distributed database, (e.g., distributed databases 410). In some embodiments, authentication service 450 may provide access or security information to authentication module 444 which may be provided to storage clients 410 as part of (or separate from) a data transfer scheme in order to perform data transfers. Authentication module 444 may also be configured to provide various keys, certificates, tokens, or other objects to distributed databases 410 so that various security mechanisms or protocols, such as Secure Sockets Layer (SSL) or Transport Layer Security (TLS), may be employed between primary and recipient distributed databases. In some embodiments, authentication module 444 may be configured to perform reconfiguration of security groups, zones, network controls, firewalls, or other network devices to allow for communications between distributed databases 410 (as discussed above with regard to FIG. 3).

Figure 9:
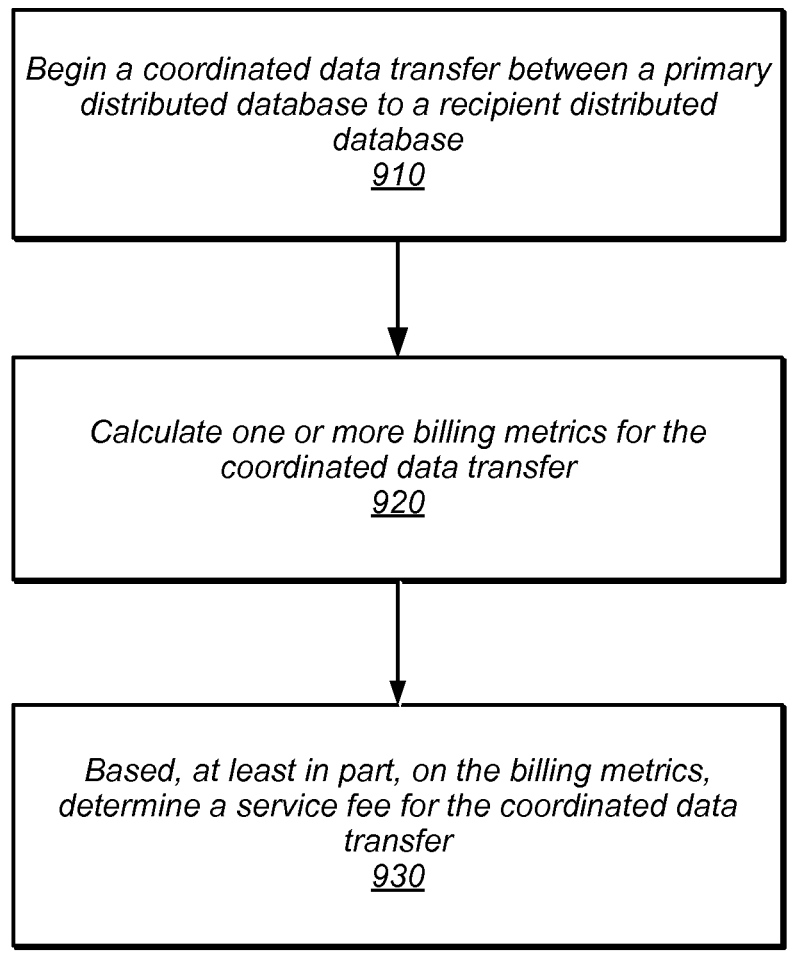
FIG. 9 is a high-level flowchart illustrating various methods and techniques for determining a service fee for the data transfer, according to some embodiments.

In some embodiments, front end 440 may implement metering module 446. Metering module 446 may be configured to collect, calculate, and/or analyze various metrics of distributed database (and associated user/client/customer) use of replication coordination service 430. For example, metering module 446 may determine the size or amount of data transferred, the amount of resources allocated to provide coordination at replication coordination service 430, and/or the length or amount of time the replication coordination service 430 was utilized. Metering module 446 may also be configured to calculate various rates, measures, or other units of work performed by replication coordination service 430. Based on these billing metrics and/or calculations, a service fee may be calculated and assigned to or associated with a respective user/client/customer account. FIG. 9, discussed below, provides various techniques and methods for metering and determining services fees that may be implemented by metering module 446.

As noted above, coordination clusters 460 may be implemented in order to provide replication coordination services for a respective data transfer. For example, in some embodiments, a data transfer scheme may be generated based on cluster configuration information obtained for a primary and recipient distributed databases. A coordination cluster 460 may be assigned to maintain, service updates to, perform various operations on, and/or provide access to data transfer schemes (including state information for the data transfer) for distributed databases, such as distributed databases 410, performing coordinated data transfers. For example, in some embodiments, replication coordination service may provide network endpoints, IP addresses, or other location information to distributed databases 410 in order that they may directly communicate with one or more compute nodes in a coordination cluster 460 in order to perform a coordinated data transfer. Coordination clusters 460 may implement consensus or consistency schemes in order to ensure that updates or changes made to state information and/or the data transfer scheme are consistent (at least eventually). For example, in some embodiments a Paxos-based or other agreement technique to replicate state (e.g., the data transfer scheme) such as ZooKeeper Atomic Broadcast (Zab) implemented as part of "Apache Zookeeper" (which is a registered trademark of the Apache Software Foundation incorporated in the United States and/or other countries). Thus, when an update to the data transfer scheme is received (such as detection/determination that storage node in a primary or recipient distributed database has failed), the update may be consistently propagated among compute nodes in a coordination cluster so that any access to the data transfer scheme accesses a consistent state at any one compute node in the coordination cluster.

Figure 5:
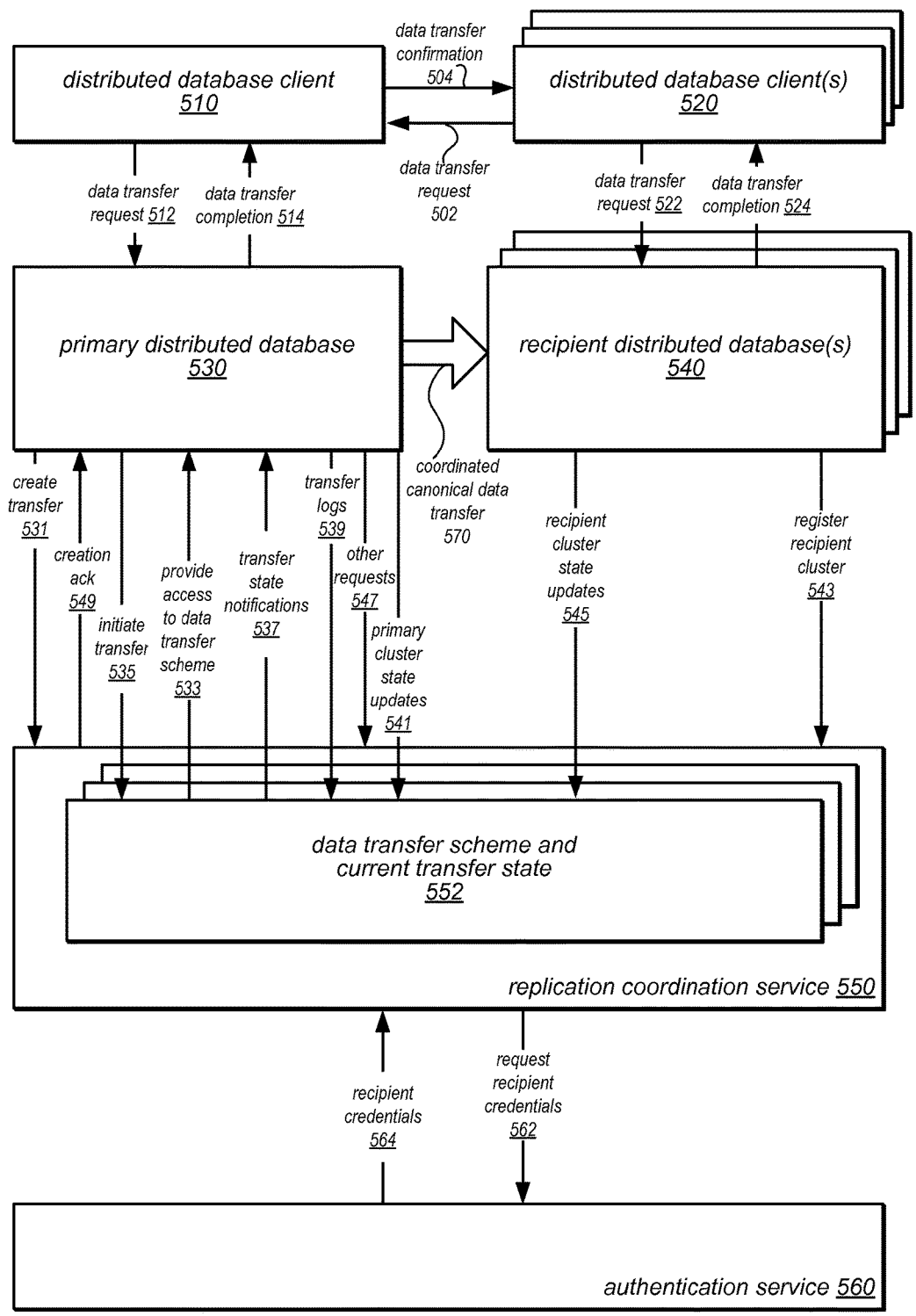
FIG. 5 is a block diagram illustrating interactions between distributed databases performing a data transfer and a replication coordination service, according to some embodiments.

FIG. 5 is a block diagram illustrating interactions between distributed databases (such as distributed databases 310, 320, 332, 334, and 410 discussed above with regard to FIGS. 3 and 4) performing a data transfer and a replication coordination service (such as replication coordination service 300 and 430 discussed above with regard to FIGS. 3 and 4), according to some embodiments. In various embodiments, distributed database client 510 (which may be similar to client 250 discussed above with regard to FIG. 2) may collect, own, analyze, generate or otherwise obtain data. In some embodiments, distributed database client 510 may be data marketplace Distributed database client 510 may maintain this data in primary distributed database 530. The data maintained at primary distributed database 530 may be transferred according to a canonical data format (e.g., a sorted map format). One or more distributed database clients (s) 520 (which may be similar to client 250 discussed above with regard to FIG. 2) may be configured to request data transfer 502 from distributed database client 510. For example, distributed database client 510 may be implemented as a network-based site and ordering system which may offer data for sale. Distributed database client(s) 520 may be configured to access the site and send purchase requests for data to the network-based site. Data transfer request 502 may also include information such as the identity or location of a recipient distributed database(s) 540 which are to receive the transferred data. Recipient distributed databases may be configured to read, understand, translate, or maintain transferred data according to the same canonical data format as primary distributed database 530.

In various embodiments, distributed database client 510 may send a data transfer request 512 to primary distributed database 530 to perform a data transfer. In some embodiments distributed database client 510 or clients 520 may communicated directly with replication coordination service 550 to setup a coordinated data transfer. Data transfer request 512 may include the specific data to transfer as well as any other transfer details (e.g., the identity of recipient distributed databases 540). Primary distributed database 530 create data transfer 531 request (or some similar coordination request) to replication coordination service 550. Create transfer request 531 may include configuration information for the primary distributed database (e.g., identifiers, roles (e.g., leader/master/slave), locations (e.g., network addresses), or any other information about primary distributed database that may be used to generated a data transfer scheme. Replication coordination service 550 may send a creation acknowledgment 549 of create transfer request 531 to primary distributed database 530. In some embodiments, creation ack 549 may include a confirmation number, job id, or other reference. This confirmation number 504 may be passed back to distributed database client 510 and/or 520 so that recipient distributed database(s) 540 may register as recipients for the correct data transfer based on the confirmation number.

Distributed database clients 520 may send a data transfer request 552 to recipient distributed databases 540 to request registration of the recipient distributed databases 540 for the coordinated data transfer. In some embodiment, recipient distributed databases 540 may then send a recipient cluster registration request 543 to replication coordination service 550. Recipient cluster registration request 543 may include configuration information (e.g., identifiers, roles (e.g., leader/master/slave), locations (e.g., network addresses) for storage nodes) for the recipient distributed database(s) 540. Authentication information, such as access credentials, may also be included in the request 543. In some embodiments, recipient cluster registration request 543 may also include a confirmation number, reference number, or job id identifying the particular data transfer that has been created in response to create transfer 531. In some embodiments, replication coordination service 550 may be able to associated a recipient cluster registration request 543 with a created transfer based on the identity of the recipient distributed database 540 (which may have been included in the create transfer request 531). In some embodiments, replication coordination service 550 may send a request to recipient distributed database 540 to register/obtain configuration information concerning recipient distributed database(s) 540.

In some embodiments, replication coordination service 550 may request recipient cluster credentials 562 from an authentication service 560 (similar to authentication service 450 discussed above in FIG. 4). Authentication service 560 may determine the authority, permissions, or identity of the recipient cluster (and/or the primary distributed database) based on a user/client/customer account associated with the replication coordination service. Authentication service 560 may return requested recipient credentials 564 to replication coordination service 550 if authority, permission, and/or identity is verified. Replication coordination service 550 may incorporate the credentials in data transfer scheme 552, or send them to primary distributed database 530 for accessing recipient distributed database(s) 540. In some embodiments, authentication service 560 may be configured to perform network reconfiguration for primary distributed database 530 and recipient distributed databases 540 in order to allow for communication between the distributed databases.

Based on configuration information for primary distributed database 530 and recipient distributed database(s) 540, replication coordination service 550 may generate a data transfer scheme 552 for the data transfer. As discussed above, data transfer scheme 552 may be maintained along with current state information for the data transfer, as well as the identities, locations, and transfer operations to be performed by storage nodes of primary distributed database 530 with respect to storage nodes of recipient distributed database(s) 540. Other information, such as whether the data transfer operation is currently being performed/enabled, whether a given storage node in the primary distributed database 530 or the recipient distributed database(s) 540 is unavailable may also be maintained. A data transfer scheme, in some embodiments, may indicate whether a data transfer between primary distributed database 530 and recipient distributed databases 540 is to be a single data transfer, or multiple data transfers performed at specified intervals (such as once a week, month, quarter, etc.).

In some embodiments, primary distributed database 530 may send an initiate transfer request 535 to replication coordination service 550. Current state information 552 may be updated to reflect that the data transfer is enabled/begun. Replication coordination service 550 may provide access to data transfer scheme 533 to primary distributed database 530. Network endpoints, IP address, or other locations/pointers for which access requests may be sent to read or update data transfer scheme from storage nodes in primary distributed database may be provided. Primary distributed database 530 may, in some embodiments, select different storage nodes of recipient distributed database(s) 540 to send data to based on the configuration information in the data transfer scheme. Storage nodes of primary distributed database may then begin performing transfer operations to perform coordinated data transfer 570. Various protocols may be used, such as synchronous or asynchronous communication protocols, that include data and/or logs that may be replayed to generate the data at recipient distributed databases 540. For example, in some embodiments, primary distributed database 530 and recipient distributed database(s) 540 may be implemented as "Apache HBase" clusters (which is a registered trademark of the Apache Software Foundation incorporated in the United States and/or other countries), which may send out Write Ahead Logs to recipient storage nodes in recipient distributed database(s) 540. In some embodiments, security tokens, credentials, certificates, or other objects may be exchanged or authenticated between primary distributed database 530 and recipient distributed database(s) 540 in order to implement secure communications, such as discussed above with regard to FIG. 4.

In some embodiments, primary distributed database 530 (or storage nodes thereof) may send transfer logs 539 to be included in the data transfer scheme 552 maintained at replication coordination service 550. These transfer logs may be used to perform recovery or failover operations when storage nodes in primary distributed database 530 become unavailable, as discussed in further detail below with regard to FIG. 7. Transfer logs 539 may include the data remaining to be transferred, in some embodiments, as well as the current progress of storage nodes in primary distributed database 530 in transferring the remaining data. Other requests 547 may include various other configuration, performance, or other requests or commands (such as may be formatted according to an API) and sent to replication coordination service 550. For example, various requests to pause, terminate, speed-up, slow-down, perform checkpoint, or set up a periodic or schedule of future data transfers. Replication coordination service 550 may receive detect or determine changes in the current state information for the data transfer, such as changes in the makeup of primary distributed database 530 and/or recipient distributed database(s) 540. For example, recipient distributed databases 540 may send updates to recipient cluster state 545 to replication coordination service 550. Similarly, other requests/updates 541 may be received from primary distributed database 530 indicating similar changes to data transfer scheme 552. Replication coordination service 550 may, in some embodiments send notifications/transfer state updates 537 to primary distributed database 530, such as notifying other remaining storage nodes of a storage node's failure in order to perform a failover operation.

In various embodiments, primary distributed database 530 may send a data transfer completion message 514 to distributed database client 510 in order to indicate successful completion of data transfer. Similarly, recipient distributed database 540 may send a data transfer completion message

524 to distributed database client 510 in order to indicate successful completion of data transfer to recipient distributed database(s) 540. Note that multiple recipient distributed databases have been illustrated in FIG. 5, as well as multiple distributed database clients 520. Data may, in some embodiments, be transferred to multiple different recipient distributed databases 540 and/or distributed database client(s) 520.

Figure 6:
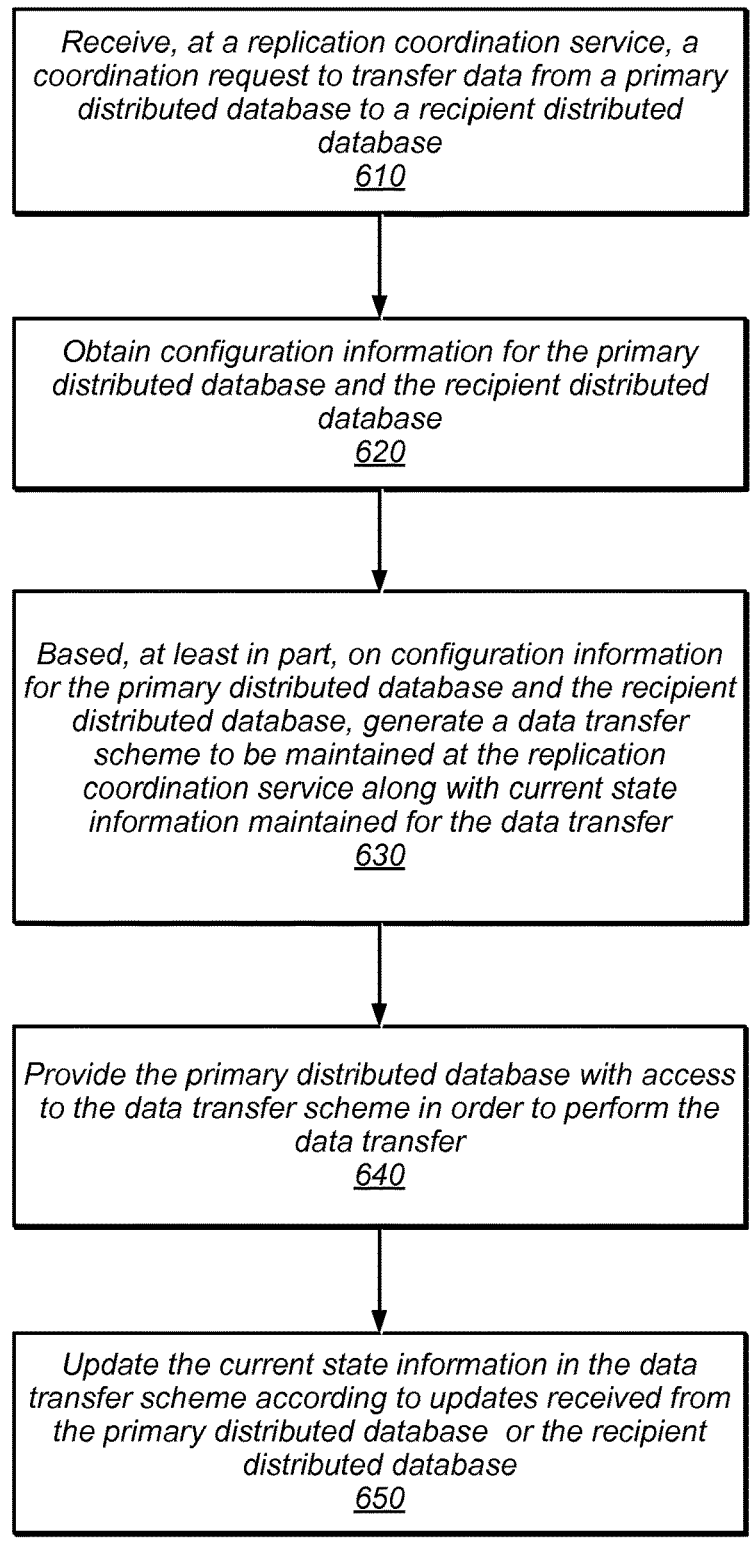
FIG. 6 is a high-level flowchart illustrating various methods and techniques for implementing a replication coordination service for data transfers between distributed databases, according to some embodiments.

The examples of distributed databases using replication coordination service discussed above with regard to FIGS. 2-5 have been given in regard to a network-based service providing a replication coordination service and a distributed database service providing distributed databases. However, various other types of distributed databases that may be implemented as separate or standalone distributed databases may perform coordinated data transfer using a network-based replication coordination service. FIG. 6 is a high-level flowchart illustrating various methods and techniques for implementing a replication coordination service for data transfers between distributed databases, according to some embodiments. These techniques may be implemented using distributed databases and/or a replication coordination service as described above with regard to FIGS. 2-5, as well as other distributed databases and/or different implementations of a replication coordination service for distributed database transfers, and thus the following discussion is not intended to be limiting as to the other types or configurations of replication coordination services or distributed databases that may implement the described techniques.

As indicated at 610, a coordination request may be received at a replication coordination service to transfer data from a primary distributed database to a recipient distributed database, in various embodiments. The coordination request may include configuration information (e.g., identifiers, roles (e.g., leader/master/slave), locations (e.g., network addresses) for storage nodes implementing the distribute database) for the primary distributed database if sent from the primary distributed database, or for the recipient distributed database if sent from the recipient distributed database. The coordination request may also include identification information for one or more recipient distributed databases (e.g., a unique identifier, an ip address or network location, etc.). In some embodiments, the coordination request may include information specific to the performance of the data transfer. For example, in some embodiments, data transfers may requested to be recurring (e.g., for data stored in a primary distributed database since the last data transfer) at specified intervals or times. The coordination request may be formatted, in some embodiments, according to an API implemented for the replication coordination service, such as the API discussed above with regard to FIG. 4. In some embodiments, the coordination request may be received via a control interface for the replication coordination service (e.g., such as an administrative console, web page, or other interface such as discussed above with regard to FIG. 4).

In at least some embodiments, the primary distributed database and the recipient distributed database may maintain data (or be configured to read, translate, or otherwise understand data) according to a same canonical data format. As discussed above, a canonical data format may be the format according to which data is arranged (e.g., during a data transfer). For example, in some embodiments a sorted map format may be implemented for transfers from a distributed database 360, storing data in tables consisting of rows identifiable by a primary key stored in sorted order, where each row may have any number of columns (e.g., row key "A" has 2 columns, whereas row key "B" has 1 column). Many other canonical data formats may be implemented for transfers between distributed databases, including, but not limited to various versions or implementations of key-value stores, column-oriented storage, document storage, object storage, and/or graph storage, and thus the previous examples are not intended to be limiting. In some embodiments, a canonical data format may be used to implement a NoSQL data store.

As indicated at 620, in response to receiving the coordination request, configuration information may be obtained for the primary distributed database and the recipient distributed database. In some embodiments, a request for the configuration information may be sent to the primary and/or recipient distributed database (if not included in a coordination request), a system or client with control of or access to the distributed database, or to a network-based services platform or distributed database service that implements the recipient distributed database. In at least some embodiments, a transfer registration request for a primary/recipient distributed database may be received that includes the configuration information for the primary/recipient distributed database. For example, the registration request for the primary/recipient distributed database may be received via a control interface for the replication coordination service (a link or other access to which may have been provided to an entity that controls the primary/recipient database and is receiving the data) by receiving an indication of a selection, input, or other control to provide the configuration information. In some embodiments another system or entity, such as a marketplace may maintain configuration information and provide the configuration information for the recipient and/or the primary distributed databases to the coordination service.

As indicated at 630, based, at least in part on the configuration information for the primary distributed database and the recipient distributed database, a data transfer scheme may be generated that is to be maintained at the replication coordination service, in various embodiments. The data transfer scheme may be maintained along with current state information maintained for the data transfer. As discussed above, a data transfer scheme may include the identities, locations, and transfer operations to be performed by a primary distributed database (e.g. performed by storage nodes of the primary distributed database) with respect to a recipient distributed database (e.g., with respect to storage nodes of the recipient distributed database). Current state information, such as whether the data transfer operation is currently being performed/enabled, whether a given storage node in the primary distributed database or the recipient distributed database is unavailable may also be maintained. A data transfer scheme, in some embodiments, may indicate whether a data transfer between primary distributed database and recipient distribute data store cluster is to be a single data transfer, or multiple data transfers performed at specified intervals (such as once a week, month, quarter, etc.).

In some embodiments, one or more compute nodes may be provisioned to maintain the data transfer cluster. For example, in response to the coordination request, 3 compute nodes may be provisioned to implement a coordination cluster that maintains a data transfer scheme. In some embodiments, an access credential for the primary distributed database may be obtained such that the recipient distributed database may be accessed in order to perform the data transfer. In some embodiments, security certificates, tokens, or other objects may be obtained in order to provide mutual authentication and/or a secure transfer protocol between the primary distributed database and the recipient distributed database. In some embodiments, security zones in which the distributed database may be implemented in, may be reconfigured to allow data transfer traffic between the distributed database systems.

As indicated at 640, the primary distributed database may be provided with access to the data transfer scheme in order to perform the data transfer, in some embodiments. Network endpoints, ip addresses, or other locations within the replication coordination service may be provided to the primary distributed database such that the primary cluster (or storage nodes thereof) may access portions of the data transfer scheme (such as the listing of storage nodes in the recipient distributed database). In this way, the primary distributed database may begin to perform the coordinated transfer to the recipient distributed database.

Changes to the primary distributed database and recipient distributed databases may occur during the performance of the data transfer. As indicated at 650, current state information in the data transfer scheme may be updated in response to updates received from the primary distributed database or the recipient distributed database. For example, in some embodiments (as discussed above with regard to FIGS. 1 and 4), storage nodes in either the primary distributed database may become unavailable (e.g., due to system or power failure, or network partition). Primary distributed database and recipient distributed databases may be configured to send update messages indicating the unavailable storage nodes to the replication coordination service. Similarly, requests to perform other operations may be received at the replication coordination service. For example, in response to receiving a termination request (e.g., prior to the completion of the data transfer), access to the data transfer scheme may be prevented in order to cease performance of the data transfer, in some embodiments.

The various methods and techniques described above with regard to FIG. 6 may be performed for multiple separate data transfers to the same recipient distributed database, or in regard to the same data (to be transferred) to multiple different distributed databases. As noted above, the method may be performed at specified intervals, for new, additional, or the same data.

Figure 7:
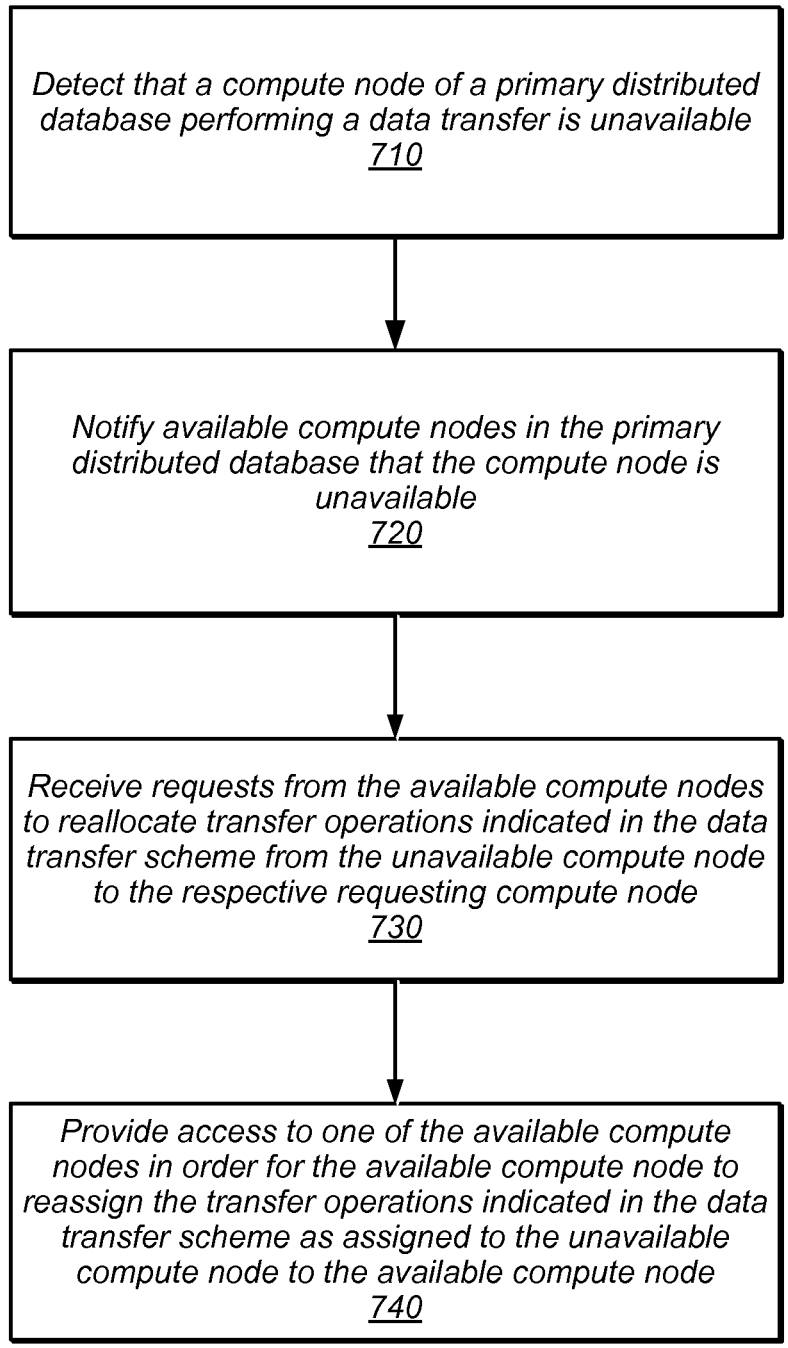
FIG. 7 is a high-level flowchart illustrating various methods and techniques for coordinating a compute node failure at a primary distributed database that is performing data transfer, according to some embodiments.

As noted above, state changes to the primary distribute database may be received, which may necessitate a coordination operation. FIG. 7 is a high-level flowchart illustrating various methods and techniques for coordinating a compute node failure at a primary distributed database that is performing data transfer, according to some embodiments. As indicated at 710, a compute node of the database performing a data transfer may be detected as unavailable. For example, a notification from a watcher or other type of status module may report the unavailability to the replication coordination service. The replication coordination service may then notify available compute nodes in the primary distributed database that the compute node is unavailable, as indicated at 720. For example, in some embodiments, the replication coordination service may broadcast a message to known compute nodes in the primary distributed database that transfer work from a particular node is available. In some embodiments, this notification may trigger a race to acquire the work. For example, as indicated at 730, requests may be received from the available compute nodes to reallocate transfer operations indicated in the data transfer scheme (or in transfer logs maintained at the replication coordination service) to the respective requesting node. Replication coordination service may implement one of many different various consensus techniques to determine which available node will successfully receive access in response to their request. Once determined, as indicated at 740, access may be provided to one of the available compute nodes in order for the available compute node to reassign the transfer operations indicated in the data transfer scheme as assigned to the unavailable compute node to the available compute node.

Figure 8:
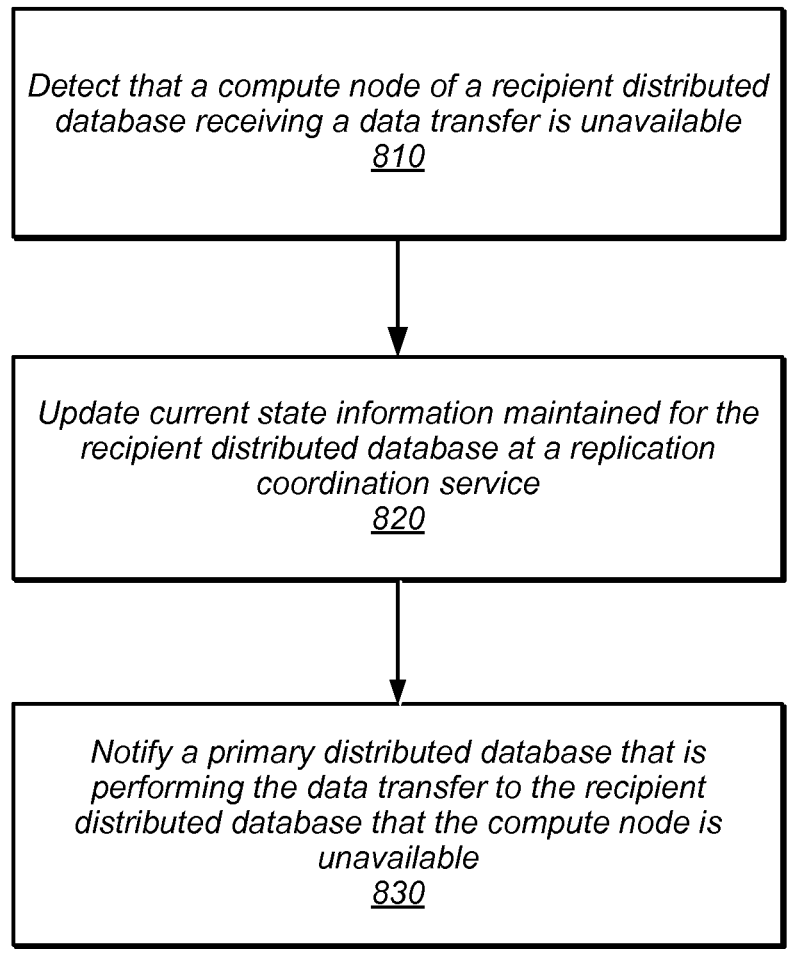
FIG. 8 is a high-level flowchart illustrating various methods and techniques for coordinating a compute node failure at a recipient distributed database that is receiving data transfer, according to some embodiments.

Similarly, updates to state information may be obtained from recipient distributed databases. FIG. 8 is a high-level flowchart illustrating various methods and techniques for coordinating a compute node failure at a recipient distributed database that is receiving data transfer, according to some embodiments. Similar to element 710 discussed above with regard to FIG. 7, a compute node of a recipient distributed database receiving a data transfer may be detected as unavailable, as indicated at 810. A recipient distributed database may implement various reporting modules or components that may update a replication coordination service of the failure. As indicated at 820, current state information maintained for the recipient distribute database at the replication coordination service may be updated. For example, state information for the respective unavailable node may be modified to indicate it is unavailable. The primary distributed database may then be notified that the compute node is unavailable, as indicated at 830, allowing the primary distributed database to modify its data transfer operations to send data to different compute node, for example.

As noted above, a replication coordination service may be offered to as a service provided to customers. FIG. 9 is a high-level flowchart illustrating various methods and techniques for determining a service fee for the data transfer, according to some embodiments. As indicated at 910, the coordinated data transfer between a primary distributed database node to a recipient distribute database may begin. While data transfer is being performed, one or more billing metrics may be calculated for the coordinated data transfer, as indicated at 920. For example, various metering, monitoring, or analyzing techniques may be deployed to capture performance information of the replication coordination service (e.g., how many compute nodes, what processing capacity used on each node—if nodes are multi-tenant performing coordination for other distributed databases as well). Characteristics of the data transfer may also be incorporated or monitored (e.g., how may recipient databases, size of data, type of data such that extra security protocols may be required, database internal or external to network provider, etc.). All such information may be used as or to determine billing metrics. For, example data throughput, transfer rate, or other measure, such as total transfer time may be used. In some embodiments, the calculated billing metrics may be streamed or sent to a billing service (or other system or service such as a data marketplace on which the data was offered or sold) for subsequent determination of a service fee. Based, at least in part, one or more of these billing metrics, a service fee may be determined for the coordinated data transfer, as indicated at 930. In some embodiments, service fees may be determined subject to other factors, such as customer discounts, price structures or tiers, or pricing models (e.g., pay as you go).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 10:
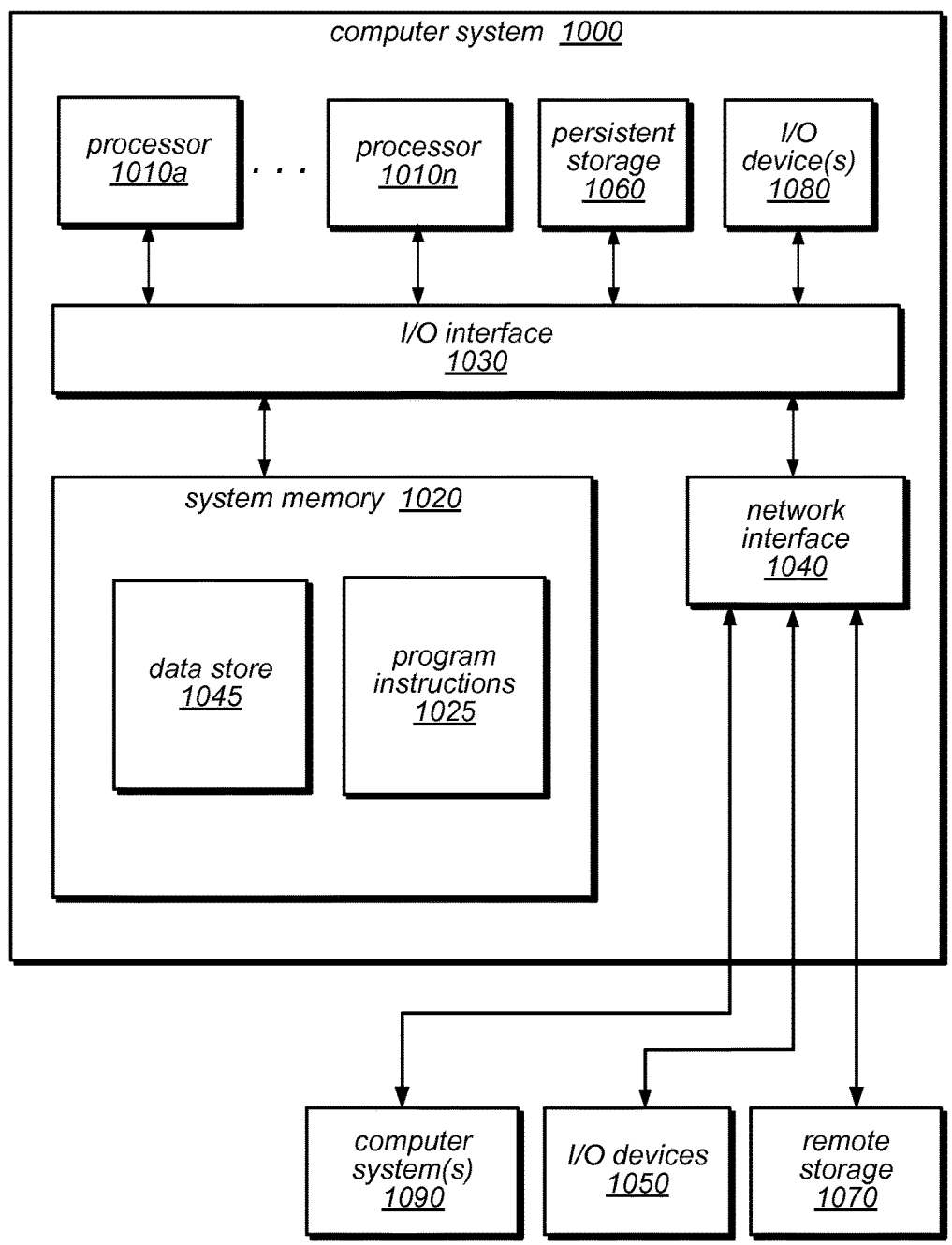
FIG. 10 a block diagram illustrating an example computing system, according to some embodiments.

Embodiments of a replication coordination service as described herein may be executed on one or more computer systems, which may interact with various other devices. FIG. 10 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a distributed database, replication coordination service, authentication service, data marketplace, compute or storage node, or various components or nodes of a storage system, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of distributed databases;
a plurality of compute nodes, implementing a replication coordination service for data transfers between distributed databases, wherein the replication coordination service is configured to:
receive a transfer creation request to coordinate a data transfer from a primary distributed database of the plurality of distributed databases to at least one recipient distributed database of the plurality of distributed databases, wherein the transfer creation request includes configuration information for the primary distributed database, wherein the configuration information includes information about a plurality of storage nodes of the primary distributed database storing data to be transferred, and wherein the primary distributed database and the at least one recipient distributed database maintain data according to a canonical data model;
receive a recipient registration request from the at least one recipient distributed database, wherein the recipient registration request includes configuration information for the at least one recipient distributed database including configuration information about a plurality of storage nodes of the at least one recipient distributed database;
in response to receiving the transfer creation request and the recipient registration request:
based, at least in part, on the configuration information for the primary distributed database and the configuration information for the at least one recipient distributed database, generate a data transfer scheme for the primary distributed database to perform the data transfer from the plurality of nodes of the primary distributed database to the plurality of nodes of the at least one recipient distributed database, wherein the data transfer scheme is to be maintained at the replication coordination service along with current state information for the data transfer;

in response to receiving an initiation request for the data transfer from the primary distributed database, provide access to the data transfer scheme to the primary distributed database in order to perform the data transfer to the at least one recipient distributed database.

2. The system of claim 1, wherein the configuration service is further configured to:
in response to receiving the transfer creation request and the recipient registration request, obtain an access credential for the primary distributed database to access the at least one recipient distributed database.

3. The system of claim 1, wherein the replication coordination service is further configured to:
in response to receiving one or more data transfer logs from different compute nodes in the primary distributed database, update the current state information maintained at the replication coordination service to include the received one or more data transfer logs.

4. The system of claim 1, wherein at least some of the plurality of distributed databases maintain different data offered at a network-based marketplace for data, wherein said receiving a transfer creation request, said receiving a recipient registration request, said generating the data transfer scheme, and said providing access to the data transfer scheme occur in response to a purchase order generated for the data transfer at the network-based marketplace for data.

5. The system of claim 1, wherein the replication coordination service is further configured to during the performance of the data transfer, calculate one or more billing metrics for the coordinated data transfer for use in determining a service fee for the coordinated data transfer.

6. A method, comprising:
performing, by a plurality of computing devices:
receiving, at a replication coordination service, a coordination request to transfer data from a primary distributed database to at least one recipient distributed database according to a canonical data model;
in response to receiving the coordination request:
obtaining configuration information for the primary distributed database and the at least one recipient distributed database, wherein the configuration information for the primary distributed database includes information about a plurality of storage nodes of the primary distributed database storing data to be transferred, wherein the configuration information for the at least one recipient distributed database includes information about a plurality of storage nodes of the at least one recipient distributed database, and wherein the primary distributed database and the at least one recipient distributed database maintain data according to the canonical data model;
based, at least in part, on the configuration information for the primary distributed database and the configuration information for the at least one recipient distributed database, generating a data transfer scheme for the data transfer to perform the data transfer from the plurality of nodes of the primary distributed database to the plurality of nodes of the at least one recipient distributed database according to the canonical data model, wherein the data transfer scheme is to be maintained at the replication coordination service along with current state information maintained for the data transfer;
providing the primary distributed database with access to the data transfer scheme in order to perform the data transfer to the at least one recipient distributed database.

7. The method of claim 6, further comprising:
receiving, at the replication coordination service, another coordination request to transfer data from a different primary distributed database to at least one different recipient distributed database; and
in response to receiving the other coordination request, performing said obtaining, said generating, and said providing for the data transfer from the different primary distributed database to the at least one different recipient distributed database.

8. The method of claim 6, further comprising:
prior to completion of the data transfer, receiving, from the primary distributed database, a termination request for the data transfer; and
in response to receiving the termination request, preventing access to the data transfer scheme in order to cease performance of the data transfer.

9. The method of claim 8, wherein the replication coordination service supports an Application Programming Interface (API) for the replication coordination service, and wherein said coordination request and said termination request are formatted according to the API for coordination and termination requests respectively.

10. The method of claim 6, further comprising during the performance of the data transfer, calculating, at the replication coordination service, one or more billing metrics for the data transfer for use in determining a service fee for the coordinated data transfer.

11. The method of claim 6, wherein the coordination request further indicates one or more additional data transfers between the primary distributed database and the at least one recipient distributed database to be performed at specified intervals, and wherein said generating and said providing are performed with respect to each of the one or more additional data transfer requests.

12. The method of claim 6, wherein the replication coordination service, the primary distributed database, and the at least one recipient distributed database are implemented as part of a same provider network.

13. The method of claim 12, wherein the primary distributed database and the at least one recipient distributed database are implemented in separate network security zones in the provider network that are configured to prevent unauthorized network traffic to the respective databases within each separate network security zone, wherein the method further comprises:
in response to receiving the coordination request, reconfiguring each of the separate network security zones to allow data transfer traffic between the primary distributed database and the at least one recipient distributed database.

14. A non-transitory, computer-readable storage medium, storing program instructions that implement a network-based replication coordination service for data transfers between distributed databases, wherein the program instructions when executed by one or more computing devices cause the one or more computing devices to implement:
receiving, at a replication coordination service, a coordination request to transfer data directly from a primary distributed database to at least one recipient distributed database according to a canonical data model;

in response to receiving the coordination request:

obtaining configuration information for the at least one recipient distributed database, wherein the configuration information for the at least one recipient distributed database includes information about a plurality of storage nodes of the at least one recipient distributed database, and wherein the primary distributed database and the at least one recipient distributed database maintain data according to the canonical data model;

based, at least in part, on configuration information for the primary distributed database and the configuration information for the at least one recipient distributed database, generating a data transfer scheme for the data transfer to perform the data transfer from the plurality of nodes of the primary distributed database to the plurality of nodes of the at least one recipient distributed database according to the canonical data model, wherein the data transfer scheme is to be maintained at the replication coordination service along with current state information maintained for the data transfer;

providing the primary distributed database with access to the data transfer scheme in order to perform the data transfer to the at least one recipient distributed database.

15. The non-transitory, computer-readable storage medium of claim 14, wherein the network-based replication coordination service implements a control interface for the network-based replication coordination service, wherein the coordination request for the data transfer is received via the control interface.

16. The non-transitory, computer-readable storage medium of claim 14, wherein the network-based replication coordination service is implemented by a plurality of compute nodes, and wherein the program instructions further cause the one or more computing devices to implement:

in response to receiving the coordination request, provisioning different ones of the plurality of compute nodes to maintain the data transfer scheme according to a distributed durability scheme.

17. The non-transitory, computer-readable storage medium of claim 14, wherein the program instructions further cause the one or more computing devices to implement updating the current state information for the data transfer maintained at the replication coordination service in response to one or more updates received from the primary distributed database or the at least one recipient distributed database.

18. The non-transitory, computer-readable storage medium of claim 17, wherein one of the one or more updates received from the primary distributed database or the at least one recipient distributed database indicates that a compute node of the primary distributed database is unavailable, and wherein the program instructions further cause the one or more computing devices to implement:

sending a notification to available compute nodes in the primary distributed database indicating the unavailable compute node;

receiving requests from different ones of the available compute nodes in the primary distributed database to reallocate transfer operations allocated to the unavailable compute node to the respective requesting available compute node; and providing access to one of the different ones of the available compute node in order to reallocate the transfer operations to the one available compute node.

19. The non-transitory, computer-readable storage medium of claim 17, wherein one of the one or more updates received from the primary distributed database or the at least one recipient distributed database indicates that a compute node of the at least one recipient distributed database is unavailable, and wherein the program instructions further cause the one or more computing devices to implement:

sending a notification to the primary distributed database indicating that the compute node of the at least one recipient database is unavailable.

20. The non-transitory, computer-readable storage medium of claim 14, wherein the replication coordination service, the primary distributed database, and the at least one recipient distributed database are implemented as part of a same provider network.

\* \* \* \* \*